United States Patent
Trowbridge et al.

(10) Patent No.: US 7,610,579 B2
(45) Date of Patent: Oct. 27, 2009

(54) CRITICAL FINALIZERS

(75) Inventors: Sean E. Trowbridge, Sammamish, WA (US); Brian M. Grunkemeyer, Redmond, WA (US); Christopher W. Brumme, Mercer Island, WA (US); Mahesh Prakriya, Redmond, WA (US); Patrick H. Dussud, Bellevue, WA (US); Ian H. Carmichael, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 549 days.

(21) Appl. No.: 11/008,831

(22) Filed: Dec. 10, 2004

(65) Prior Publication Data

US 2006/0156152 A1    Jul. 13, 2006

(51) Int. Cl.
*G06F 9/44* (2006.01)
(52) U.S. Cl. .................. 717/141; 717/140; 717/166; 714/35; 707/205; 707/206
(58) Field of Classification Search ............... 707/205, 707/206; 714/35; 717/140, 141, 166
See application file for complete search history.

(56) References Cited

U.S. PATENT DOCUMENTS

| 5,392,432 | A * | 2/1995 | Engelstad et al. ........ 707/103 R |
|---|---|---|---|
| 5,907,709 | A * | 5/1999 | Cantey et al. ............... 717/141 |
| 6,338,073 | B1 * | 1/2002 | Houldsworth et al. ....... 707/206 |
| 6,381,738 | B1 * | 4/2002 | Choi et al. .................. 717/140 |
| 7,069,279 | B1 * | 6/2006 | Rau et al. .................... 707/206 |
| 2001/0013117 | A1 * | 8/2001 | Ungar ............................ 717/5 |
| 2005/0204341 | A1 * | 9/2005 | Broussard .................... 717/124 |
| 2006/0070041 | A1 * | 3/2006 | Brumme et al. ............. 717/131 |

* cited by examiner

*Primary Examiner*—Wei Y Zhen
*Assistant Examiner*—Matthew J Brophy

(57) ABSTRACT

A finalizer may include a notification that no tolerance for failure or corruption is expected. Any potential failure point, which may be induced by a runtime execution environment routine or subroutine that is associated with the finalizer may then be prepared apart from the finalizer.

19 Claims, 6 Drawing Sheets

CRITICAL FINALIZERS

DRAWINGS

The detailed description refers to the following drawings.

DETAILED DESCRIPTION

Critical finalization for deterministic execution of code is described herein.

Figure 1:
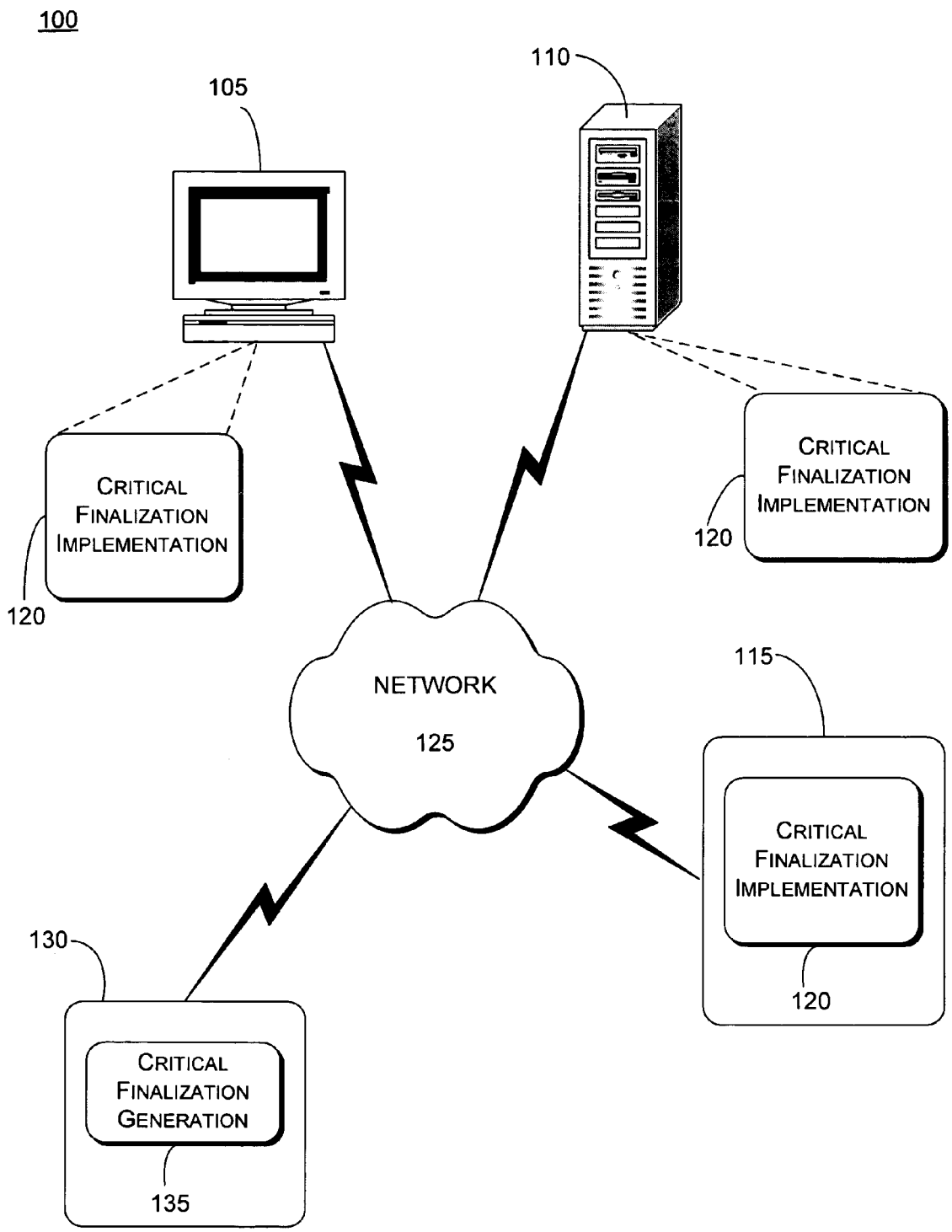
FIG. 1 shows a network environment in which examples of critical finalizers may be implemented.

FIG. 1 shows an example network environment in which critical finalizers may be implemented. More particularly, any one of client device 105, server device 110, and "other" device 115 may be capable of providing deterministic execution of code by critical finalization implementation 120, as described herein. Client device 105, server device 110, and "other" device 115 may be communicatively coupled to one another through network 125.

Client device 105 may be at least one of a variety of conventional computing devices, including a desktop personal computer (PC), workstation, mainframe computer; Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115. The data may be publicly available or alternatively restricted, e.g., restricted to only certain users or only if an appropriate subscription or licensing fee is paid. Server device 110 is at least one of a network server, an application server, a web blade server, or any combination thereof. Typically, server device 110 is any device that is the source of content, and client device 105 is any device that receives such content either via network 125 or in an off-line manner. However, according to the example implementations described herein, server device 105 and client device 110 may interchangeably be a sending host or a receiving host. "Other" device 115 may also be embodied by any of the above examples of server device 110.

"Other" device 115 may further be any device that is capable of critical finalization implementation 120 according to one or more of the example implementations described herein. That is, "other" device 115 may be any software-enabled computing or processing device that is capable of implementing at least one critical finalizer to provide deterministic execution of code corresponding to an application, program, function, or other assemblage of programmable and executable code, in either of a runtime execution environment or a testing environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 represents any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Data source 130 represents any one of a variety of conventional computing devices, including a desktop personal-computer (PC), that is capable of generating 135 a critical finalizer in connection with object-oriented code for an application, program, function, or other assemblage of programmable and executable code. Alternatively, data source 130 may also be any one of a workstation, mainframe computer, Internet appliance, set-top box, gaming console, personal digital assistant (PDA), laptop computer, cellular telephone, etc., that is capable of transmitting at least a portion of an application, program, or function to another work station. Further, although data source 130 may be a source of code for the application, program, or function, for at least the purpose of explaining one or more examples of critical finalizer implementation 120, data source 130 may be regarded as at least the source of a critical finalizer identifier. Regardless of the implementation, the critical finalizer identifier, or expression thereof, may be transmitted from data source 130 to any of devices 105, 110, and 115 as part of an on-line notification via network 125 or as part of an off-line notification.

Critical finalizer implementation 120 may be regarded as being deterministic, i.e., code that is state-consistent in the face of exceptions. Exceptions, referenced throughout this description, may refer to asynchronous executions such as thread abort conditions, out-of-memory conditions, stack overflow conditions, control deadlock resolution conditions, execution termination conditions, and execution interruption conditions. These conditions are asynchronous in the sense that they are not typically expected in the normal execution of the authored code.

Further, critical finalizer implementation 120 may be appropriate for most application programming interface environments. However, the exceptional conditions described above are typically injected by a runtime execution environment in which code is executed. Therefore critical finalizer implementation 120 is described in the context of a runtime execution environment, although such setting is provided only as an example and is not intended to be limiting in any manner. Examples of runtime execution environments may include: Visual Basic runtime execution environment; Java® Virtual Machine runtime execution environment that is used to run, e.g., Java® routines; or Common Language Runtime (CLR) to compile, e.g., Microsoft .NET™ applications into machine language before executing a calling routine.

Runtime execution environments may provide routines for application programs to perform properly in an operating system because application programs require another software system in order to execute. Thus, an application program may call one or more runtime execution environment routines, which may reside between the application program and the operating system, and the runtime execution environment routines may call the appropriate operating system routines.

Runtime execution environments have been developed to enhance the reliability of software execution on a growing range of processing devices including servers, desktop computers, laptop computers, and a host of mobile processing devices. Runtime execution environments may provide a layer of abstraction and services to an application running on a processing device, and further provide such an application with capabilities including error handling and automatic memory management.

According to at least one example of a runtime execution environment, memory management may include "garbage collection," among other memory management techniques, that implements finalization and in particular, critical finalization. Garbage collection may be regarded as a robust feature of managed code execution environments by which an object is automatically freed (i.e., de-allocated) if an object is no longer used by any application, as detected upon a sweep or scan of a memory heap of which at least a portion was previously allocated to the object. That is, garbage collection may be regarded as reclamation of memory space that has been previously allocated to an object, but is no longer accessible. Such reclamation may be controlled by a user or, more typically, automatically implemented by the execution environment. An instantiation of a class (i.e., an object) may be considered to be unreachable if all references to it become invalid, for example, by setting references to a null reference.

Finalization code (alternatively referred to herein as "finalizer") for an object may provide a runtime execution environment with an opportunity to free up resources (e.g., file descriptors or operating system graphics contexts) that may not be assuredly reclaimed during garbage collection. Each class of object using resources may provide a finalizer implementation for the purpose of freeing the set of resources used within that class (or more generally, cleaning up any state modified by an instance of this class), with the loose expectation that the finalizer will be run eventually. Thus, in connection with implementation of garbage collection to reclaim memory allocated for an unreachable object, finalization code corresponding to the object may be called.

Critical finalization implementation 120 may provide code high-level assurances (e.g., guarantees) that finalization code for an instantiation of a class in their applications is run. A description of the purposes for such assurances is not necessary for implementing the examples described herein.

Figure 2A:
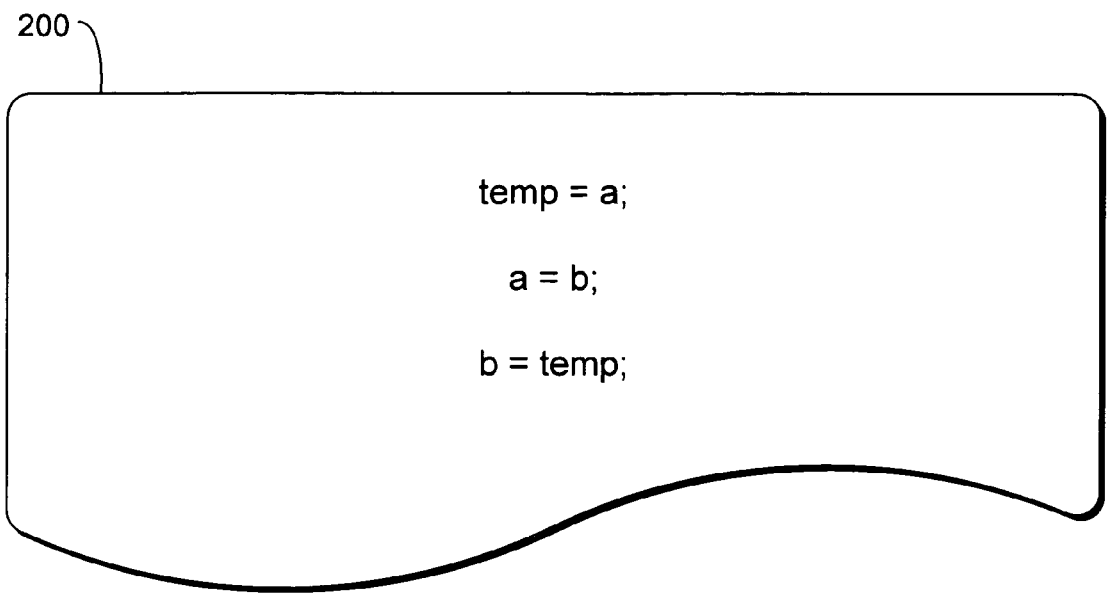
FIG. 2A shows an example of at least a portion of finalization code according to at least one implementation of critical finalizers.

FIG. 2A shows an example of at least a portion of application code 200 corresponding to an application, program, function, or other assemblage of programmable and executable code having a critical finalizer therein. Application code 200 may be transmitted from device 130 to at least one of devices 105, 110, and 115 (see FIG. 1) for execution. In particular, application code 200 may be submitted for execution by a runtime execution environment (i.e., system or infrastructure) that is intended to execute programs at one of devices 105, 110, and 115.

The runtime execution environment routines and sub-routines called by application code 200 may, in turn, call appropriate operating system routines in order for application code 200 to be executed. Therefore, unless an author of application code 200 is intimately knowledgeable of the implications of the runtime execution environment routines and subroutines that may be injected into portions of application code 200 in order for application code 200 to be executed on the operating system, deterministic execution of application code 200 may be uncertain in the runtime execution environment.

In the event that the author of application code 200 does not possess comprehensive knowledge, or is otherwise ignorant, of runtime execution environment routines and subroutines as well as any effects that such routines and subroutines may have on the execution of application code 200, substantive measures may be required to provide deterministic execution of application code 200, i.e., execution that is not interrupted or corrupted by exceptions including, but not limited to, a runtime execution environment induced resource failure. Non-limiting examples of such unanticipated or undesired conditions resulting from runtime execution environment routines or subroutines that are injected into application code 200 may include, but are not limited to, resource failures such as a thread abort conditions, out-of-memory conditions, stack overflow conditions, control deadlock resolution conditions, execution termination conditions, and execution interruption conditions.

A thread abort condition is a call to abort a thread in which application code 200 is being executed. The motivations for a thread abort condition are numerous, and do not need to be articulated for understanding of the example embodiments described herein. Suffice to say that the injection of a runtime execution environment routine or subroutine into application code 200 may produce a thread abortion condition.

An out-of-memory condition may result if the execution of a runtime execution environment routine or subroutine within a designated portion of application code 200 requires amounts of hardware memory or virtual memory that are not compatible with other processes, and therefore such memory allocations may not be accommodated. A stack overflow condition may result if the execution of the runtime execution environment routine or subroutine within the designated portion of application code 200 requires more hardware memory or virtual memory than is available on a stack. Alternatively, a stack overflow condition may occur as a result of a runtime execution environment routine or subroutine that has an infinite recursion or a level of method calls that extends beyond a predetermined threshold level.

Figure 2B:
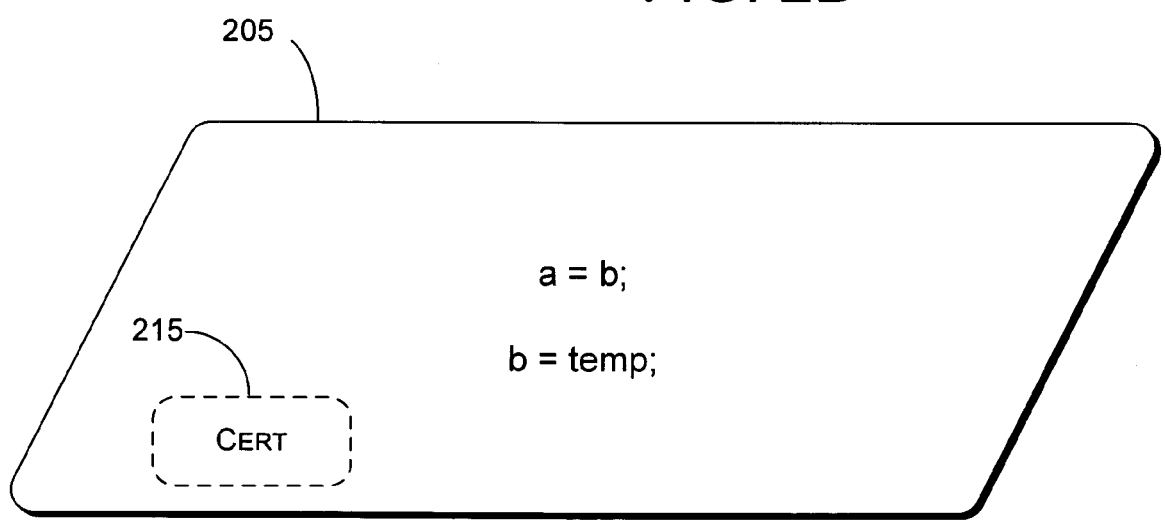
FIG. 2B shows an example of at least a portion of finalization code, further to the example of FIG. 2A, according to at least one implementation of critical finalizers.

FIG. 2B shows an example of critical finalizer 205, which may be regarded as a data structure containing an expression of the identification of a critical finalizer in application code 200. Critical finalizer 205 may be attached to application code 200 or embedded in application code 200. Alternatively, application code 200 and critical finalizer 205 may be separate data entities that are transmitted alone or separately online or via a computer-readable medium. Furthermore, in alternative embodiments, either one of application code 200 and critical finalizer 205 may include an annotation of potential process interrupting or corrupting conditions that may be anticipated as a result of runtime execution environment injected routines or subroutines.

In FIG. 2B, critical finalizer 205 may be regarded as a data structure including the following lines of code:

a=b;

b=temp;

which may be deemed to be the critical finalizer of application code 200. However, alternative embodiments of critical finalizer 205 may include different expressions of critical finalizer identification. For instance, critical finalizer 205 may otherwise identify a critical finalizer of application code 200 by indicating line numbers that bound a critical finalizer within application code 200, or critical finalizer 205 may identify a critical finalizer by indicating a function corresponding to a critical finalizer.

Further alternative embodiments of critical finalizer 205 may include, or otherwise refer to, certificate 215. That is, as described further below, examples of critical finalization implementation 120 may be prohibited unless one or more layers of permissions are provided by an author of application code 200.

In addition, a critical finalizer 205 may comprise non-contiguous portions of application code 200, and therefore critical finalizer 205 may include any combination of expressions of identification of a non-contiguous critical finalizer as described above. Further still, application code 200 may include more than one critical finalizer, which may be identified as described above in one or more renditions of critical finalizer 205.

Figure 3:
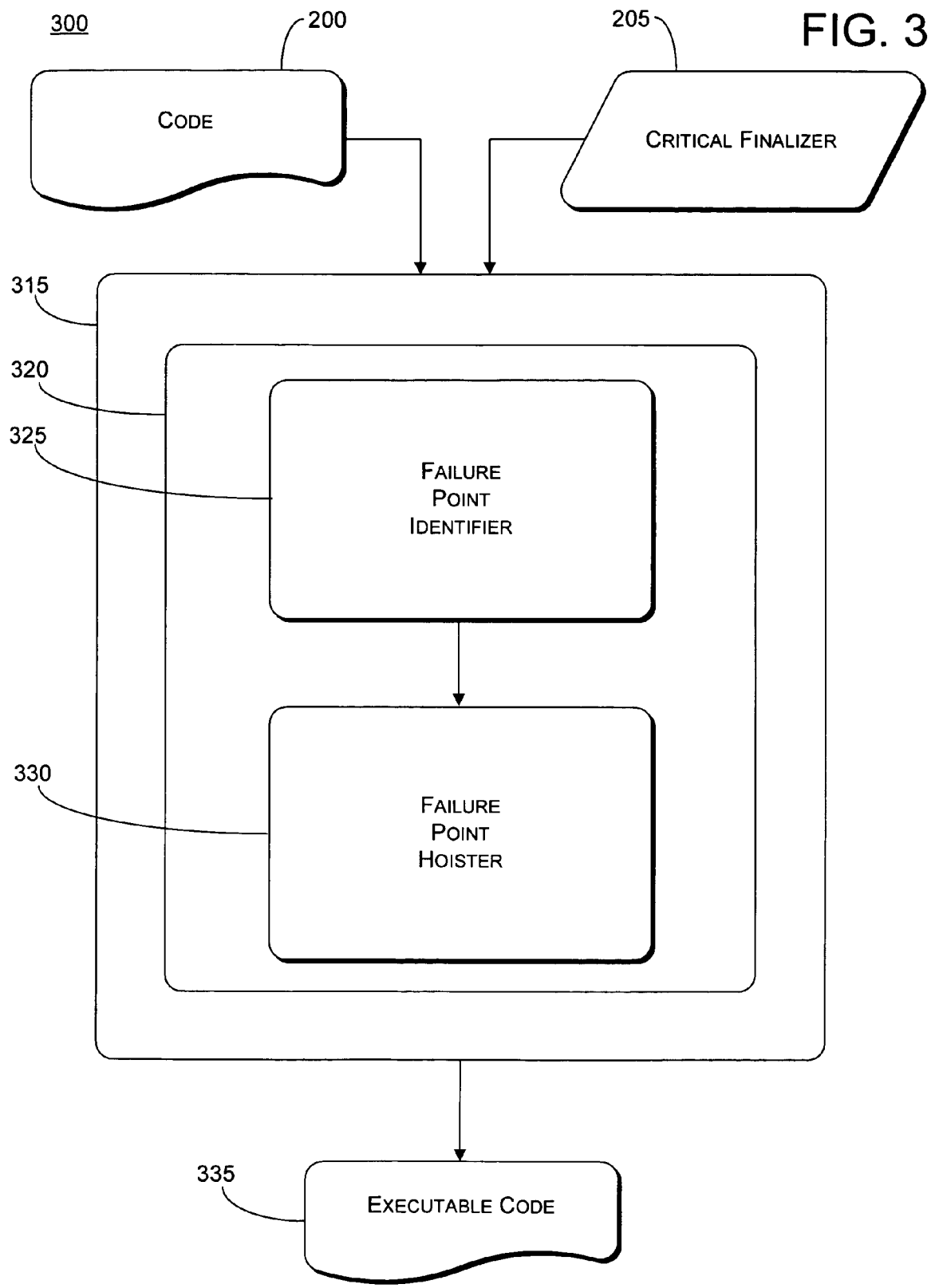
FIG. 3 shows an example processing flow for preparing a critical finalizer.

FIG. 3 shows an example processing flow for critical finalization implementation 120 (see FIG. 1), and a description thereof is provided with reference to application code 200 and critical finalizer 205 (see FIG. 2).

In FIG. 3, application code 200 may be transmitted to processing device 315 from an external source including, but not limited to, the authoring source of application code 200. The transmission of application code 200 may be made via an on-line transmission or via a computer-readable medium such as, but not limited to, a compact disc.

Similarly, critical finalizer 205 may also be transmitted to processing device 315 from an external source (e.g., data source 130; see FIG. 1). An authoring source of application code 200 may likely be the entity most knowledgeable of the capabilities and limitations of application code 200, and therefore may be a source of critical finalizer 205 containing a notification that an identified sub-set of application code 200 is not expected to tolerate runtime execution environment induced failure, interruption, or corruption during the execution of the identified sub-set of, or appendage to, application code 200 (i.e., critical finalizer 205). In other words, the authoring source of application code 200 may provide, or otherwise identify, critical finalizer 205 in application code 200 to processing device 315. In alternative embodiments, a source other than the authoring source of application code 200 may provide critical finalizer 205, or identification thereof, to processing device 315. Further, the transmission of critical finalizer 205, or identification thereof, may be made via an on-line transmission or via a computer-readable medium such as, but not limited to, a compact disc.

Processing device 315 may be any one of client device 105, server device 100, or "other" device 115 described above with reference to FIG. 1. Further, runtime execution environment 320 may reside on processing device 315, and failure point identifier 325 may itself be a runtime execution environment routine. According to one example embodiment, the runtime execution environment may be part of a compiling program.

Failure point identifier 325 may serve to identify runtime execution environment routines or subroutines that, if failure thereof was to occur, may induce a resource failure leading to, at least, interruption or corruption of the critical finalizer 205. According to one example, upon receiving or identifying critical finalizer 205, failure point identifier 325 may identify any routines or subroutines corresponding to runtime execution environment 320 that may be injected into critical finalizer 205 in application code 200 on an operating system (OS) for processing device 325. The identified runtime execution environment routines or subroutines may also be referred to as "failure points."

Failure point hoister 330 may serve as a parser to effectively remove the runtime execution environment routines or subroutines that, if failure thereof was to occur, may induce a resource failure leading to, at least, interruption or corruption of critical finalizer 205. That is, failure point hoister 330 may displace the processing associated with the identified runtime execution environment routine or subroutine to a point (i.e., scheduled sequence in time) that, in at least one embodiment, precedes critical finalizer 205. Thus, the execution of the hoisted failure point is effectively rescheduled. Alternative examples contemplate a user specifying a line in application code 200 preceding critical finalizer 205 to which the failure point is hoisted. Non-limiting examples of failure points that may be hoisted include running class initializers, loading and compiling code relevant to the finalizer, and other runtime execution environment routines or subroutines directed towards making available a transitive call graph of the critical finalizer.

The above described hoisting may be part of the "eager preparation" of critical finalizer 205, which may increase the likelihood that execution of a runtime execution environment routine or subroutine associated with critical finalizer 205 will not suffer a failure leading to interruption or corruption of critical finalizer 205 since any potential failure points associated with critical finalizer 205 are typically pre-executed prior to executing the code within critical finalizer 205 (i.e., execution of a potential failure point is rescheduled). Critical finalization may be implemented to hoist any potential failure points to a point (i.e., scheduled sequence in time) before a first instance of a class defining a critical finalizer (e.g., at class load time or class initialization time) is created, thus rendering any resources or state changes made in a class instance constructor releasable by the critical finalizer of that particular class. More particularly, by eagerly preparing critical finalizer 205, potentially corrupting runtime execution environment routines and subroutines are likely to be exposed before imposing any expense on the execution of identified critical finalizer 205 or, perhaps, other portions of application code 200.

Alternative embodiments may contemplate displacing the processing associated with the identified runtime execution environment routine or subroutine to a point that follows critical finalizer 205. According to one such example, failure point hoister 330 may disable a runtime execution environment routine or subroutine (e.g., thread abort), allow critical finalizer 205 to execute, and then inject the now-enabled runtime execution environment routine or subroutine at a point immediately following completion of critical finalizer 205. Other examples may contemplate failure point hoister 330 displacing (i.e., rescheduling) the identified runtime execution environment routine or subroutine to a point of execution (i.e., scheduled sequence in time) that follows critical finalizer 205, either immediately or further along, if processing subsequent to that of critical finalizer 205 is deemed acceptable by either the authoring source of application code 200 or the source of critical finalizer 205. Thus, application code 200, critical finalizer 205, or an identifier of critical finalizer 205 may include an annotation that displacement of the runtime execution environment routine or subroutine to a point after critical finalizer 205 is acceptable.

Still further alternative embodiments may contemplate displacing the processing associated with the identified runtime execution environment routine or subroutine to a different thread than that in which critical finalizer 205 may be executed. In other words, the "eager preparation" of critical finalizer 205 may occur before, after, or even in parallel with the execution of critical finalizer 205. Regardless, the example embodiments described herein are capable of providing reliable execution of a designated sub-set of executable code (i.e., critical finalizer 205) to provide a deterministic execution environment.

Figure 4:
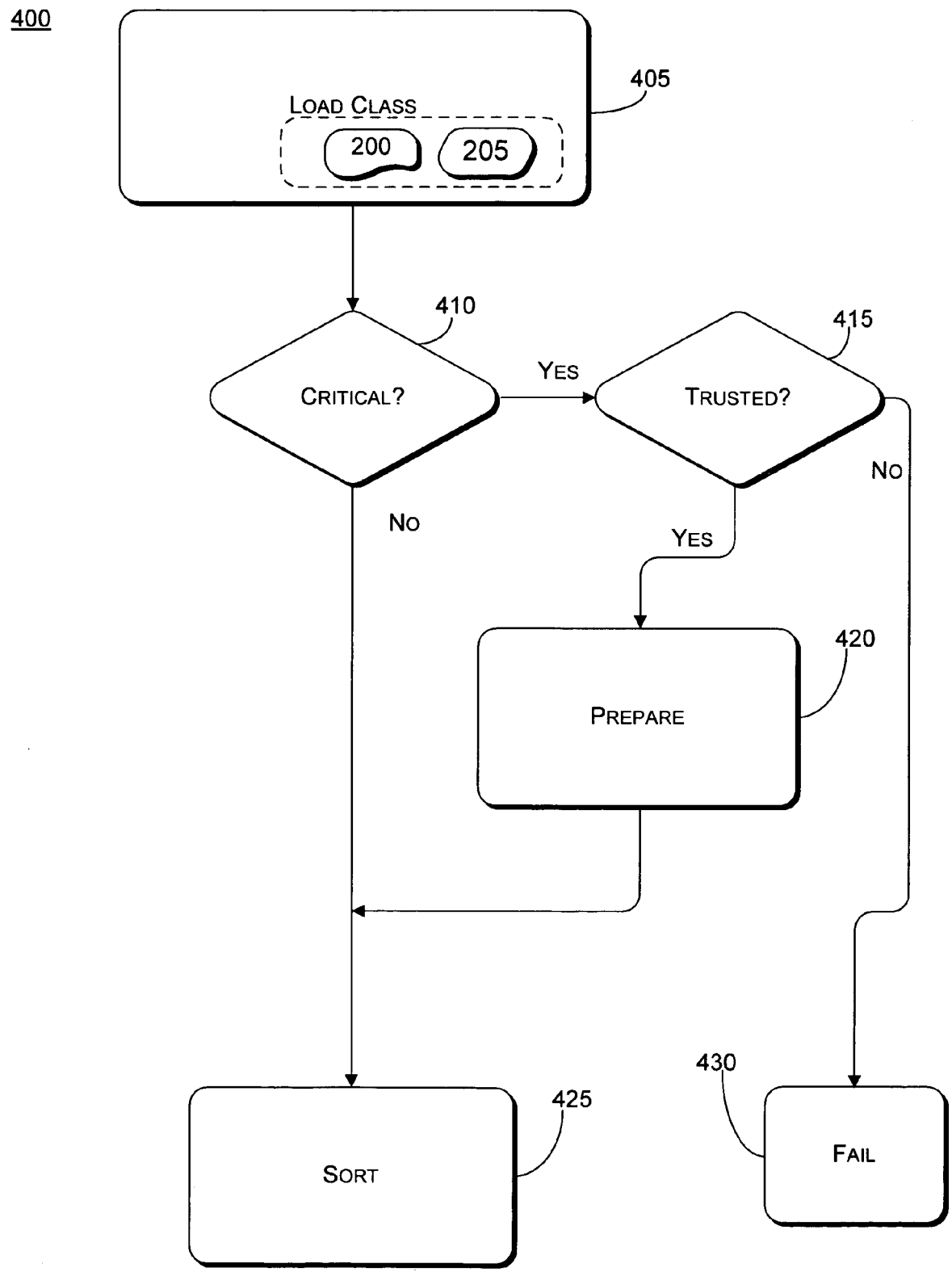
FIG. 4 shows an example processing flow associated with critical finalizer implementation.
Figure 5:
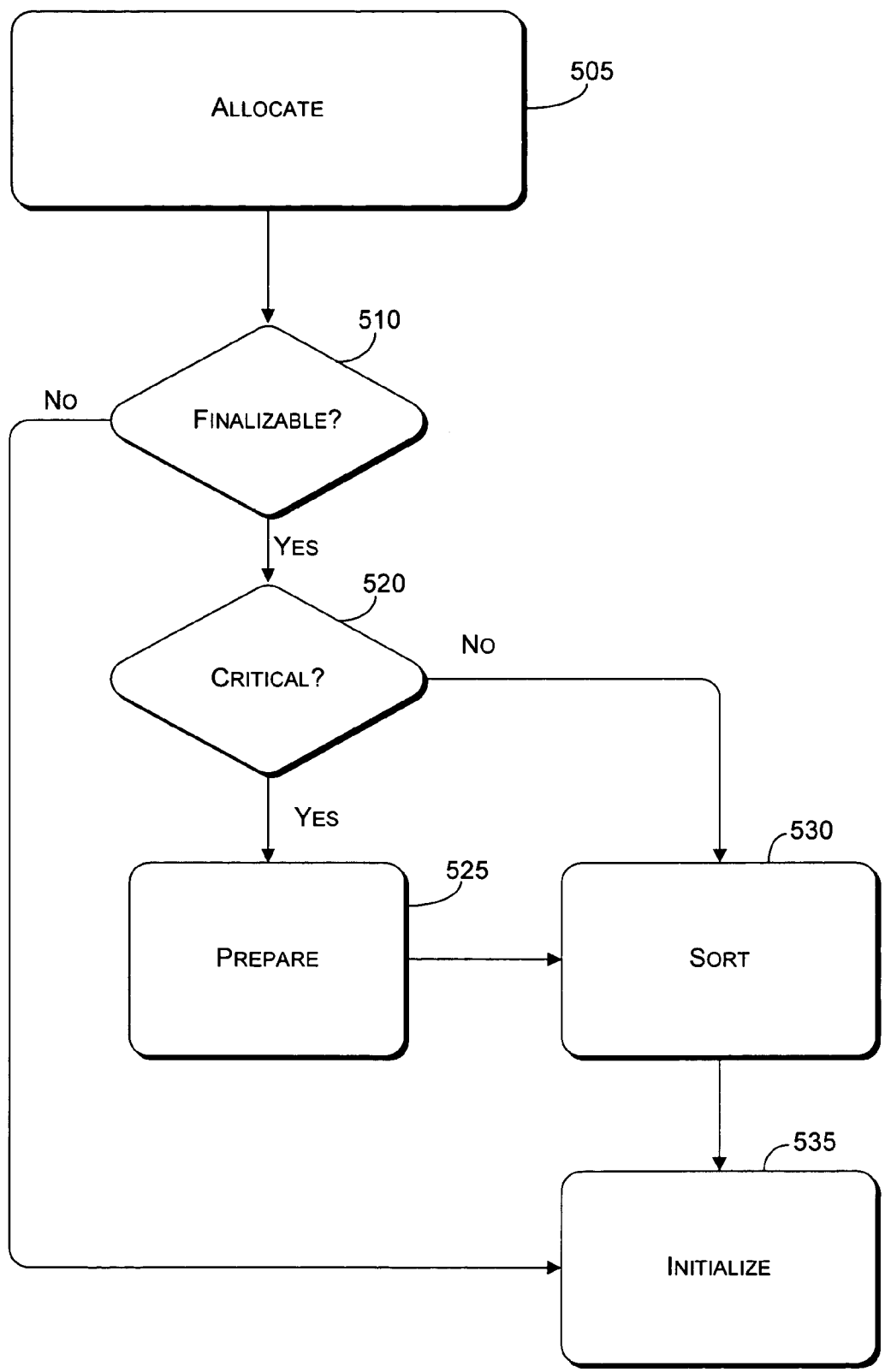
FIG. 5 shows another example processing flow associated with critical finalizer implementation.
Figure 6:
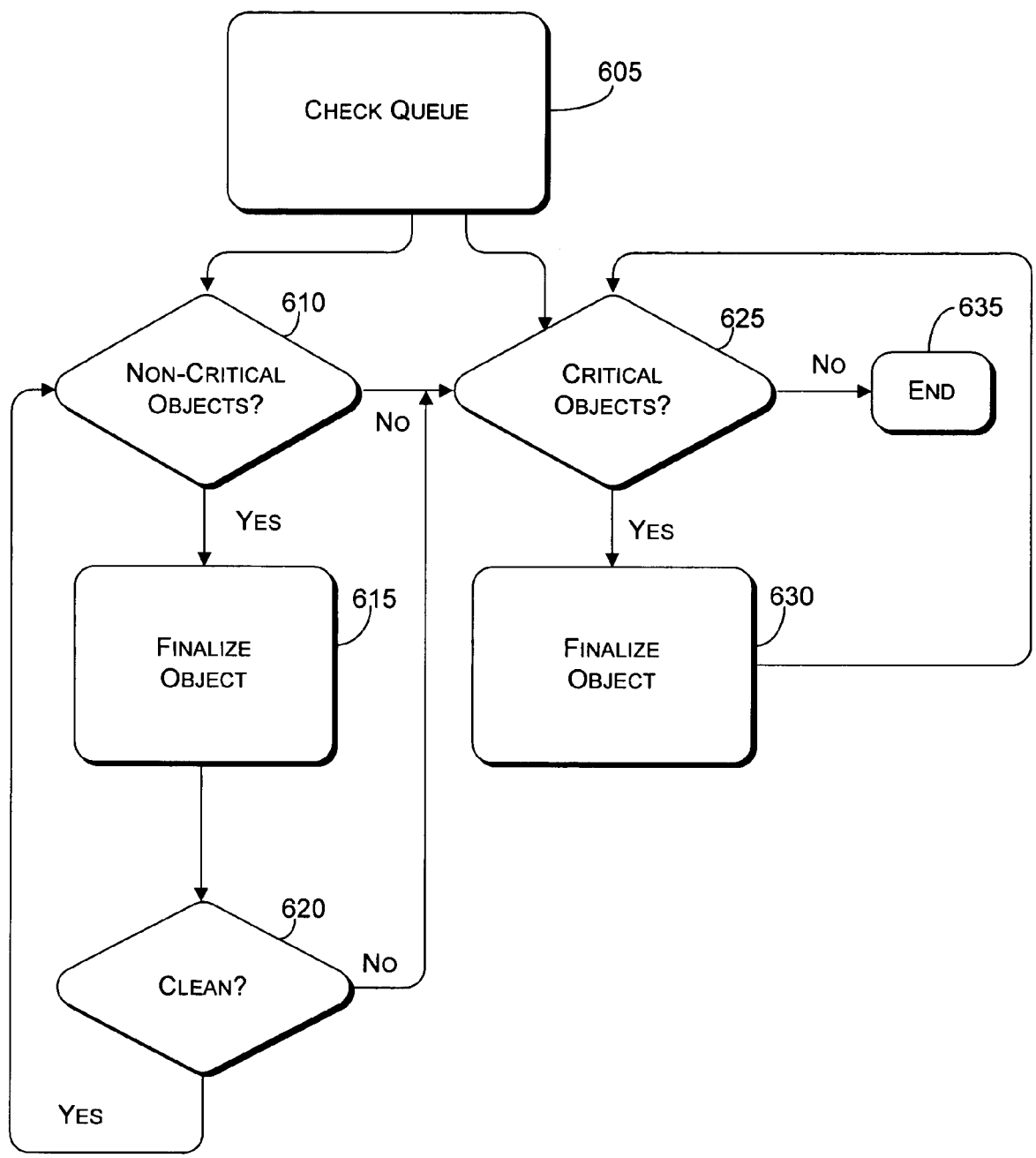
FIG. 6 shows yet another example processing flow associated with critical finalizer implementation.

FIGS. 4-6 show example processing flows pertaining to various examples of critical finalization implementation 120 (see FIG. 1) by, e.g., a runtime execution environment. The descriptions of FIGS. 4-6 are provided with reference to application code 200 and critical finalizer 205 (see FIGS. 2 and 3). However, any reference to the modules of FIG. 2 is for descriptive purposes only, and it is to be understood that FIGS. 2 and 3 represent non-limiting examples of a processing environment. Further, processing flows 400 (FIG. 4), 500 (FIG. 5), and 600 (FIG. 6) are provided as descriptive examples only, and therefore are not intended to be limiting in terms of the order, sequence, and combinations of the processing blocks described below. That is, alternative examples of processing flows 400, 500, and 600 may include the blocks described below in different orders, sequences, or even combinations.

FIG. 4 shows processing flow 400, in which at least portions of critical finalization implementation 120 are executed as one or more classes are loaded to memory.

Block 405 refers to loading a class from storage to memory. According to an example implementation, the loading at block 405 includes loading a class that may include, or otherwise refer to, at least one of application code 200 and critical finalizer 205.

Decision 410 refers to a determination of the presence of a critical finalizable attribute for the class loaded at block 405. More particularly, since not all objects of a class require finalization, decision 410 may be implemented to determine whether the loaded class has a finalization attribute or application code 200 and critical finalizer 205.

Decision 415 refers to a determination, made subsequent to positive decision 410, of whether critical finalizer 205 is trusted. That is, according to various examples of critical finalization implementation 120, critical finalizer 205 may include, or otherwise refer to, certificate 215 as means for the author of application code 200 and critical finalizer 205 to indicate that permission has been granted for processing flow 400 by the runtime execution environment in connection with critical finalizer 205. However, alternative examples of critical finalization implementation 120 may not require such permissions for execution by the runtime execution environment.

Block 420 refers to eagerly preparing critical finalizer 205 subsequent to positive decision 415, i.e., critical finalizer 205 is determined to have sufficient permissions or when such permissions are not required. More particularly, at block 420 the processing associated with an identified runtime execution environment routine or subroutine that may induce a resource failure in critical finalizer 205 may be removed from critical finalizer 205 and processed beforehand. Alternatively, the processing for the identified runtime execution environment routine or subroutine may be removed for processing after that of critical finalizer 205. Thus, such "eager preparation" increases the likelihood that execution of critical finalizer 205 will not suffer a failure leading to interruption or corruption of critical finalizer 205 since any potential failure points associated therewith are typically pre-executed prior to executing the code within critical finalizer 205. That is, as set forth above with regard to FIG. 3, by eagerly preparing critical finalizer 205, potentially corrupting runtime execution environment routines and subroutines are likely to be exposed before imposing any expense on the execution of identified critical finalizer 205 or, perhaps, other portions of application code 200.

Block 425 refers to sorting critical finalizer 205 from non-critical finalizers in connection with classes loaded at block 405. More particularly, subsequent to negative decision 410 or the preparing at block 420, one or more critical finalizers 205 may be sorted from non-critical finalizers within a single queue or in separate queues of memory. According to at least one alternative example, the separate queues may be two or more separate queues in which finalizers are apportioned according to varying criteria including, e.g., levels of permission.

Block 430 refers to a failure state that occurs subsequent to negative decision 415. More particularly, upon determining that a class loaded at block 405 has a critical attribute or critical finalizer 205 but does not have permission (e.g., certificate 215) required for critical finalizer implementation 120, the runtime execution environment may throw an exception so that no object corresponding to the loaded class may be initialized.

FIG. 5 shows processing flow 500, in which at least portions of critical finalization implementation 120 are executed as memory is allocated for programs to which one or more constructed objects correspond.

Block 505 refers to allocating memory for one or more constructed objects. According to an example implementation, the allocating at block 505 may include allocating memory for objects that may include, or otherwise refer to, at least one of application code 200 and critical finalizer 205 (see FIGS. 2 and 3).

Decision 510 refers to a determination of the presence of a finalizable attribute for the objects for which memory is allocated. More particularly, since not all objects of a class require finalization, decision 510 may be implemented to determine whether a constructed object has a finalization attribute or at least application code 200.

Decision 520 refers to a determination of whether the constructed object has critical finalizer 205 (i.e., a critical finalization attribute) in addition to application code 200. Alternatively, decision 520 may refer to a determination of whether a present critical finalizer 205 is trusted (i.e., whether critical finalizer 205 includes certificate 215).

Block 525 refers to eagerly preparing critical finalizer 205 subsequent to positive decision 520. More particularly, at block 525 the processing associated with an identified runtime execution environment routine or subroutine that may induce a resource failure in critical finalizer 205 may be removed from critical finalizer 205 and processed beforehand. Alternatively, the processing for the identified runtime execution environment routine or subroutine may be removed for processing after that of critical finalizer 205 or into a separate thread. That is, critical finalizer 205 may be eagerly prepared and, therefore, potentially corrupting runtime execution environment routines and subroutines are likely to be exposed before imposing any expense on the execution of identified critical finalizer 205 or, perhaps, other portions of application code 200.

Block 530 refers to sorting critical finalizer 205 from non-critical finalizers in connection with classes loaded at block 405. More particularly, subsequent to negative decision 520 or after preparation at block 525, one or more critical finalizers 205 may be sorted from non-critical finalizers within a single queue or in separate queues of memory. In the example of a single queue, each constructed object may have a flag indicating whether a corresponding finalizer is critical or not. According to at least one alternative example, the separate queues may be two or more separate queues in which finalizers are apportioned according to varying criteria including, e.g., levels of permission. The finalizer or critical finalizer may then be added to the appropriate queue.

Block 535 refers to initializing the objects sorted at block 530.

FIG. 6 shows processing flow 600 in which initialized objects are finalized in accordance with at least one example of critical finalization implementation 120 (see FIG. 1).

Block 605 refers to the runtime execution environment checking the one or more queues of finalizable objects to determine which objects are ready for finalization. That is, at block 605, those objects that are unreachable are detected.

Decision 610 refers to a determination of whether any of the objects determined to be unreachable at block 605 are non-critical. A positive determination may be made based on the absence of a critical attribute or critical finalizer 205 from an object. Alternatively, a positive determination may be made based on the presence of a non-critical attribute corresponding to an object.

Block 615 refers to the finalization of non-critical objects detected at decision 610.

Decision 620 refers to a determination of whether the finalization occurring at block 615 occurs cleanly (i.e., there are no exceptional conditions when executing critical finalizer 205).

A positive determination at decision 620 may result in a return to decision 610 to determine the presence of further non-critical objects that are ready for finalization. Thus, the example processing sequence from decision 610, block 615, and decision 620 may be repeated until either there are no further non-critical objects eligible for finalization or a determination is made at decision 620 that an exception has occurred during finalization of an object at block 615.

Decision 625 refers to a determination of whether any of the objects determined to be unreachable at block 605 are critical. That is, subsequent to negative decision 610 or negative decision 620, a positive decision 625 may be made based on the presence of a critical attribute or critical finalizer 205 associated with a detected object. In alternative examples, decision 625 may be implemented subsequent to block 605 in the event that an execution error is indicated as the runtime execution environment checks the one or more queues of finalizable objects.

Block 630 refers to the finalization of critical objects detected at decision 625.

Because the finalizer for the critical objects detected at decision 625 has been eagerly prepared (see block 420 in FIG. 4; block 525 in FIG. 5), a high-level of assurance has been provided that critical finalizer 205 would be executed without an occurrence of an exception. Such high-level of assurance may or may not constitute a guarantee, but may, at the very least, be considered to be beyond the level of best efforts typically afforded finalization code by a runtime execution environment. Additionally, the critical finalizer may be subject to constraints that may be implemented so that the critical finalizer is not enabled to call an operation that may fail. The processing at block 630 may be repeated so long as a critical object is detectable at decision 625.

Block 635 refers to the termination of finalization processing subsequent to negative decision 625. Accordingly, critical finalization implementation may include the finalization of non-critical objects prior to the finalization of critical objects, as a matter of ordering.

The examples described above, with regard to FIGS. 1-6, may be implemented in a computing environment having components that include, but are not limited to, one or more processors, system memory, and a system bus that couples various system components. Further, the computing environment may include a variety of computer readable media that are accessible by any of the various components, and includes both volatile and non-volatile media, removable and non-removable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, comprising:
    identifying a class having prioritized finalization code, wherein the identifying includes receiving an indication that at least a sub-set of the finalization code expects to have no tolerance for failure;
    preparing the finalization code for an instance of the identified class, wherein the preparing includes:
        identifying a potential failure point associated with at least a portion of the finalization code; and
        hoisting the identified failure point to a designated execution location either preceding or following at least the portion of the finalization code; and
    executing the finalization code for the instance of the identified class.

2. A method according to claim 1, wherein the identifying further includes receiving an indication that at least a sub-set of the finalization code expects to have no tolerance for a runtime execution environment induced resource failure.

3. A method according to claim 2, wherein the runtime execution environment induced resource failure includes at least one of a thread abort condition, an out-of-memory condition, a stack overflow condition, a control deadlock resolution condition, an execution termination condition, and an execution interruption condition.

4. A method according to claim 1, wherein the preparing further includes:
    identifying at least a portion of a runtime execution environment routine that has a potential to induce a failure during processing in correspondence with at least a portion of the finalization code; and
    rescheduling at least the identified portion of the runtime execution environment routine for execution separate from at least the portion of the finalization code.

5. A method according to claim 4, wherein the rescheduling includes hoisting at least the identified portion of the runtime execution environment routine to a designated execution location preceding at least the portion of the finalization code.

6. A method according to claim 4, wherein the rescheduling includes hoisting at least the identified portion of the runtime execution environment routine to a designated execution location following at least the portion of the finalization code.

7. A method, comprising:
    loading one or more classes, wherein the one or more classes include finalization attributes, wherein a finalization attribute of at least one of the one or more classes comprises a prioritized finalization attribute comprising a critical finalizer;
    preparing the critical finalizer, wherein the preparing includes:
        identifying a potential failure point associated with at least a portion of the critical finalizer; and
        hoisting the identified failure point to a designated execution location either preceding or following at least the portion of the critical finalizer;
    sorting the loaded classes based on respective finalization attributes, wherein the sorting includes sorting loaded classes having a prioritized finalization attribute from loaded classes having a non-prioritized finalization attribute; and
    finalizing objects of the loaded classes in an order based on the sorting, wherein the finalizing includes performing a garbage collection sweep on objects of the loaded classes, running a finalizer for objects with the non-prioritized finalization attribute before objects having a prioritized finalization attribute.

8. A method according to claim 7, wherein a finalizer is prepared before initialization of the sorted classes having a prioritized finalization attribute, and wherein further the finalizing includes performing a garbage collection sweep on objects of the loaded classes having non-prioritized finalization attributes before objects of the loaded classes having prioritized finalization attributes.

9. A method, comprising:
    sorting classes having a non-prioritized finalization attribute and classes having a prioritized finalization attribute;
    preparing a finalizer for a sorted class having a prioritized finalization attribute, wherein preparing the finalizer includes:
        identifying a potential failure point associated with at least a portion of the finalizer; and
        hoisting the identified failure point to a designated execution location either preceding or following at least the portion of the finalizer;
    finalizing a first constructed object for a sorted class having the non-prioritized finalization attribute; and
    finalizing a second constructed object for a sorted class having the prioritized finalization attribute, wherein the finalizing of the first constructed object occurs before the finalizing of the second constructed object.

10. A method according to claim 9, wherein the sorting includes sorting classes into separate queues in accordance with prioritization finalization attributes for the respective classes.

11. A method according to claim 9, wherein the sorting includes sorting the classes within a single queue in accordance with prioritization finalization attributes for the respective classes.

12. A computer-readable storage medium having one or more executable instructions that, when read, cause one or more processors to:
    prepare a first finalizer for a class having a first attribute, wherein the first attribute is a critical finalizable attribute, wherein preparing the first finalizer includes:
        identifying a potential failure point associated with at least a portion of the first finalizer; and
        hoisting the identified failure point to a designated execution location either preceding or following at least the portion of the first finalizer;
    execute a second finalizer for an object of a class having a second attribute, wherein the second attribute is a non-critical finalizable attribute; and
    execute the first finalizer for an object of the class having the first attribute, wherein the first attribute indicates that the first finalizer for the class having the first attribute is to be executed after execution of the second finalizer for an object of a class having the second attribute.

13. A computer-readable storage medium according to claim 12, wherein the one or more instructions to prepare the finalizer for the class having the first attribute further cause the one or more processors to:
    identify a potential failure point associated with at least a portion of the finalizer; and
    reschedule at least the identified potential failure point for execution separate from at least the portion of the finalizer for the class having the first attribute.

14. A computer-readable storage medium according to claim 12, wherein the one or more instructions to prepare the finalizer for the class having the first attribute further cause the one or more processors to:

identify at least a portion of a runtime execution environment routine that has a potential to induce an exceptional condition during execution of at least a portion of the finalizer; and hoist at least the portion of the identified runtime execution environment routine to be executed apart from at least the portion of the finalizer having the first attribute.

15. A computer-readable storage medium according to claim 12, wherein the first attribute indicates that the finalizer for the class having the first attribute is to be executed in exceptional conditions.

16. A computer-readable storage medium according to claim 12, further comprising one or more executable instructions that, after execution of the one or more instructions to prepare the finalizer for the class having the first attribute, cause the one or more processors to construct an object for the class having the first attribute.

17. A system, comprising:
 means for identifying a class having prioritized finalization code and a prioritized finalization attribute;
 means for preparing the prioritized finalization code for an object constructed from the identified class, wherein the means for preparing includes:
  means for identifying a potential failure point associated with at least a portion of the prioritized finalization code; and
  means for hoisting the identified failure point to a designated execution location either preceding or following at least the portion of the prioritized finalization code; and
 means for executing the prioritized finalization code for the constructed object,
 wherein the means for identifying determines that at least a portion of the prioritized finalization code expects to be executed after execution of finalization code for an object of a class having a non-prioritized finalization attribute.

18. A system according to claim 17, wherein the means for identifying determines that at least a portion of the finalization code expects to be executed in the event of an exception.

19. A system according to claim 17, wherein the object is constructed after the means for preparing the finalization code prepares the finalization code.

* * * * *